United States Patent
Carcagno et al.

(10) Patent No.: US 7,506,900 B2
(45) Date of Patent: Mar. 24, 2009

(54) THREADED JOINT FOR PIPES PROVIDED WITH SEAL

(75) Inventors: Gabriel E. Carcagno, Buenos Aires (AR); Matteo Morotti, Alzano Lombardo (IT)

(73) Assignee: Tenaris Connections AG, Schaan (LI)

( * ) Notice: Subject to any disclaimer, the term of this patent is extended or adjusted under 35 U.S.C. 154(b) by 0 days.

(21) Appl. No.: 11/816,598

(22) PCT Filed: Feb. 16, 2006

(86) PCT No.: PCT/EP2006/060023

§ 371 (c)(1),
(2), (4) Date: Jul. 2, 2008

(87) PCT Pub. No.: WO2006/087361

PCT Pub. Date: Aug. 24, 2006

(65) Prior Publication Data

US 2008/0265569 A1  Oct. 30, 2008

(30) Foreign Application Priority Data

Feb. 17, 2005 (IT) .................. RM2005A0069

(51) Int. Cl.
*F16L 15/00* (2006.01)
*F16L 13/14* (2006.01)
(52) U.S. Cl. ............... 285/333; 285/382; 285/382.1
(58) Field of Classification Search .......... 285/333, 285/334, 355, 382, 382.1, 382.2, 390
See application file for complete search history.

(56) References Cited

U.S. PATENT DOCUMENTS

| 4,153,283 | A | | 5/1979 | Hellmund |
| 4,795,200 | A | | 1/1989 | Tung ................ 285/334 |
| 4,907,828 | A | * | 3/1990 | Chang ................ 285/24 |
| 5,954,374 | A | * | 9/1999 | Gallagher et al. ...... 285/332 |
| 6,375,232 | B1 | | 4/2002 | Robinson ............ 285/220 |
| 6,607,220 | B2 | * | 8/2003 | Sivley, IV ........... 285/334 |
| 6,851,727 | B2 | | 2/2005 | Carcagno et al. ....... 285/333 |
| 6,857,668 | B2 | * | 2/2005 | Otten et al. .......... 285/334 |
| 6,905,150 | B2 | | 6/2005 | Carcagno et al. ....... 285/334 |
| 6,921,110 | B2 | | 7/2005 | Morotti et al. ........ 285/94 |
| 6,971,681 | B2 | | 12/2005 | Dell'Erba et al. ...... 285/55 |
| 7,240,928 | B2 | * | 7/2007 | Evans et al. .......... 285/333 |
| 7,255,374 | B2 | | 8/2007 | Carcagno et al. ....... 285/334 |
| 2005/0127672 | A1 | * | 6/2005 | Ellington et al. ...... 285/382 |
| 2005/0236834 | A1 | * | 10/2005 | Curley et al. ......... 285/333 |
| 2007/0024053 | A1 | * | 2/2007 | Sivley et al. ......... 285/333 |
| 2007/0035132 | A1 | * | 2/2007 | Benzie ............... 285/334 |
| 2007/0228730 | A1 | * | 10/2007 | Sivley et al. ......... 285/334 |

FOREIGN PATENT DOCUMENTS

| CH | 279191 | 11/1951 |
| EP | 130178 | 1/1985 |
| GB | 1272463 | 4/1972 |

* cited by examiner

*Primary Examiner*—James M Hewitt
(74) *Attorney, Agent, or Firm*—Fitzpatrick, Cella, Harper & Scinto

(57) ABSTRACT

A threaded joint for pipes comprising at least one seal of the metal-metal interference type arranged externally to the female thread. The joint has an extension of the box beyond the seal which produces an elastic tightening band effect on the seal so that excessive interference on the seal is not necessary, thus favoring correct making up.

11 Claims, 1 Drawing Sheet

THREADED JOINT FOR PIPES PROVIDED WITH SEAL

FIELD OF THE INVENTION

The present invention relates to a joint for pipes, in particular to a joint for pipes used in the extraction/injection of fluids, for example oil or gas, provided with a seal device.

STATE OF THE ART

In the natural gas and oil extraction industry, segments of pipes of a pre-defined length are used which must be joined together at their end to reach the considerable depths at which the reservoirs of hydrocarbons are generally found. During drilling the wells are lined with metal pipes throughout their length. The segments of metal pipe, generally approximately ten meters or so long, are screwed together by means of threaded joints. To cover the entire depth of the well numerous strings are also used which have, for reasons connected with the mechanical resistance and the geological characteristics of the formation, decreasing diameter the greater the depth reached by the string, so as to constitute a "telescopic" type structure.

Once drilling has been completed, another tubular string is inserted inside the well lined as above, said string serving to convey the gas or oil towards the outside of the underground reservoir. This string, which is positioned throughout the depth of the well, can therefore in certain cases reach lengths of several thousands of meters.

In both cases, the pipe segments are joined together by means of threaded joints, which can be integral, i.e. with one end of the threaded pipe being male and the other being female, or of the sleeve type, with both ends of the threaded pipe being male and joined by a female threaded sleeve on both sides. Normally the presence of the joint entails an increase in the external diameter of the string at the joint itself, which results in greater overall dimensions of the line and hole the greater the external diameter of the joint with respect to the pipe.

To limit the external diameter of the string and consequently the costs of drilling and the material installed, threaded joints with reduced overall diameter are produced, which can be conventionally grouped into three types, according to the performance required and the maximum overall dimensions permitted. A first type, which is often known as semi-flush, is a joint of the sleeve type, the external diameter of which exceeds the external diameter of the pipe by no more than 6%. A second type, generally known as near-flush, is an integral type joint, the external diameter of which exceeds the external diameter of the pipe by 2-3%. A last type, known as flush, is an integral joint, the external diameter of which in the area of the joint is equal to that of the pipe. The choice of the various types of joint is made according to the load which the tubular string has to withstand, the pressure exerted inside and/or outside it, its length and the maximum overall diameter permitted in relation to the diameter of the well.

The problem of the seal of these threaded joints is of particular importance. One type of seal is currently produced by the interference between two surface sections of the male and female pipes in which the surfaces are kept in direct metal contact via a pressure appropriate for the operating conditions of the pipes. In these joints the seal between male and female member is guaranteed if the contact pressure, generated during making up of the seal surfaces, is sufficient to prevent detachment in all areas of the two metal lips as a result of the combined stress acting on the joint. The various types of stress include mainly the pressure of the fluids present outside and/or circulating inside the pipes which add up to other loads, for example the axial traction or compression loads and the flexion loads. The results of said loads are particularly negative when they tend to separate the male and female members, eliminating the contact between the seal surfaces and therefore affecting or destroying tightness, causing a leak in the pipe. The seal surfaces must therefore be appropriately sized taking account of the material of which the pipes are made, the rigidity of the two members and, above all, according to the diameter interference between male and female member so as to maintain an adequate metal-metal contact pressure in any working condition. Nevertheless a problem that occurs in designing seal surfaces of the type in which there is metal-metal contact for the joints is that of not exceeding the contact pressure limit. In case of excessive interference, in fact, cold-welding or seizure of the two seal surfaces of the joints can occur before completion of making up of the two members. On the other hand, however, if the value of said interference remains insufficient, the tightness of the joint could be affected when subject to high pressure.

A first example of a known joint is that of document U.S. Pat. No. 4,795,200. In this document the joint is provided with an extension, at the end of the male member, used in combination with a seal produced with conical surfaces. Said surfaces do not have the acute problems of seizure which characterise other types of metal-metal seal. A second example of a known joint is the one described in the document EP-A-130178 where an external seal of the metal-metal contact surfaces type is present. In this case, during the making up of two members, the diameter interference can cause a normal pressure on the surface of the female member, the end of which tends to expand radially towards the outside. Said expansion is even more marked if high traction loads occur, resulting even in plastic deformation of the metal in the seal surface area. In this case, after the elastic limit of the female member has been exceeded, deformations can accumulate which tend to increase its internal diameter, reducing the interference and consequently the seal capacity of the joint. The efficiency of the seal therefore depends heavily on this phenomenon and, in particular, the pipe may not be suitable to withstand the external pressure once it has been subjected to particularly high internal pressure. This can therefore cause the formation of a leak in the pipe with possible losses. A breakage, especially after the pipes have been positioned underground, therefore making it practically impossible for the operators to intervene directly on any joint that breaks, can have extremely serious financial consequences for the extraction plant in addition to causing considerable environmental damage, particularly if the reservoir contains aggressive elements.

A first solution proposed by the state of the art to avoid the drawback mentioned is to produce pipes with walls of greater thickness so that they are more rigid.

An alternative solution is to produce pipes consisting of a material with more appropriate mechanical properties. Both solutions, however, involve a considerable increase in production costs.

There is therefore the need to produce an innovative joint for pipes which overcomes all the above-mentioned drawbacks, at the same time limiting production costs.

SUMMARY OF THE INVENTION

A primary aim of the present invention is to produce a threaded joint for pipes provided with an improved seal which maintains an adequate rigidity, in particular in the case of integral joints of the flush or near-flush type which have a relatively fine pipe wall thickness in the joint area.

A further aim is to improve the structural resistance of the joint to high loads, in particular to compression loads, without said characteristic affecting the seal capacity.

The present invention therefore proposes to achieve the above aims by producing a threaded joint for pipes, defining a longitudinal axis which, in accordance with claim 1, has a first and a second pipe segment, the first segment defining a male member of the joint and the second segment defining a female member of the joint, in which the first segment is provided with a male thread at one end and the second segment is provided with a female thread designed to be screwed to the male thread to constitute the joint, in which the first segment is provided with a first seal surface and the second segment is provided with a second seal surface positioned between one end of the female thread and the nearest end of the second segment of pipe, the first and the second seal surfaces having dimensions such as to generate a reciprocal interference by deformation of the material of the first and second segments of pipe, at least in the end of screwing position, thus constituting a metal-metal type joint seal, the joint being characterised in that a reinforcement section is positioned at the end of the second segment of pipe which protrudes beyond the female thread, in which the reinforcement section has at all its points an internal diameter larger than the external nominal diameter of the first segment of pipe, such as not to generate any contact between the first and second segments of pipe throughout the length of the reinforcement section.

Advantageously, by appropriate sizing of the joint seal device, subject of the present invention, an excellent level of efficiency can be achieved via the right balance between the various needs, at times conflicting, for minimum overall dimensions, maximum structural resistance and conservation of the seal capacity to prevent outflow and/or inflow of the fluids from/into the pipe, also after the joint has been assembled and disassembled numerous times.

Furthermore the dimensions chosen for the joint of the invention with sealing surfaces allow a good compromise to be achieved as regards resistance to both axial and radial loads.

The dependent claims describe preferred embodiments of the joint of the invention.

BRIEF DESCRIPTION OF THE FIGURES

Further characteristics and advantages of the invention will become clearer in the light of the detailed description of a preferred but not exclusive embodiment of a threaded joint for pipes given by way of non-limiting example, with the help of the accompanying drawings in which.

DETAILED DESCRIPTION OF A PREFERRED EMBODIMENT OF THE INVENTION

Figure 1:
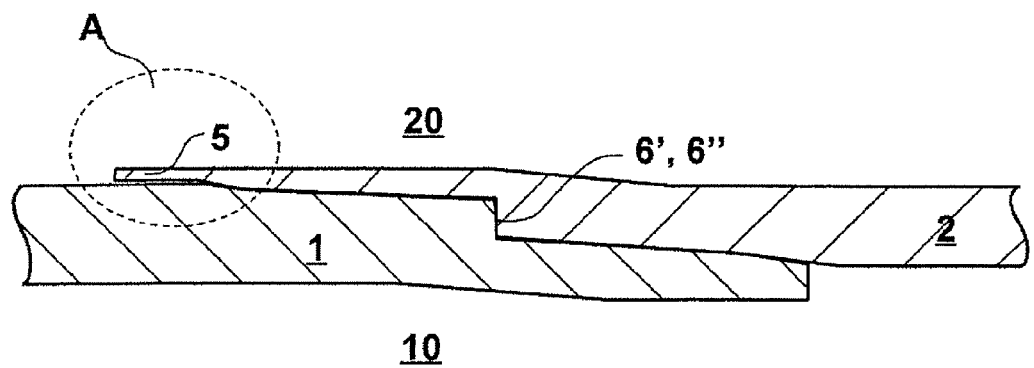
FIG. 1 shows a section of the joint, according to the present invention, along a plane passing through its longitudinal axis.
Figure 2:
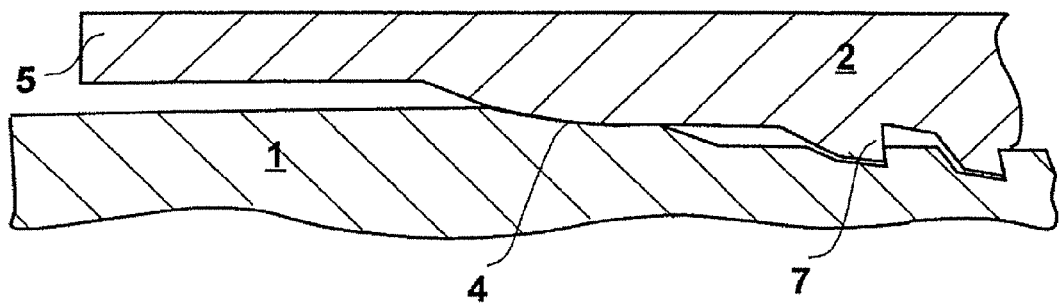
FIG. 2 shows an enlargement of an area, indicated by letter A, of the section of the joint of FIG. 1.

With reference to the figures, the threaded joint comprises two members, the segments of pipe, in which one is the male member 1 or "pin" and the other is the female member 2 or "box". The joint defines an internal part 10 in which the fluid flows, for example natural gas or crude oil or other similar fluid, and an external part 20 which can also be lapped by fluids or other liquids of various nature, generally under pressure, or only causing hydrostatic loads.

The threaded joint advantageously provides for a seal in the external part in which tightening is produced during reciprocal making up of the pin 1 and box 2, by means of interference of two circumferential sections of the metal surfaces. In the female member 2 the circumferential section or seal surface 4, contributing to constitution of the seal device, is internal to the wall of the pipe, appropriately sized and positioned at a pre-set distance from the initial section of the female thread 7.

The seal surface 4, or simply seal, is substantially spherical or toroidal in shape. The female member 2 is also appropriately provided with an extension, defined also reinforcement section 5, which extends beyond the female thread 7 and the seal surface 4. One characteristic of said extension is that it is sized so that it does not have any point or surface of contact with the male member 1 after complete making up of the two members male 1 and female 2. This reinforcement section 5, therefore, is not directly subject to any contact tension by the male member 1.

During make up of pin and box, due to the interference that exists between the seal surface 4 of the female member and the surface of the male member 1, appropriately defined in the design phase, radial forces are produced which act on the seal surface 4 of the female member 2 which are transformed into a diameter increase of the female member. In turn the male member 1 undergoes shrinkage, but the thinner the wall of the pipe, the greater the deformation of said male member. Consequently the male member shrinks to a very limited extent while the female member expands significantly. The deformations in the area of the seal surface 4 are transmitted to the reinforcement section 5 due to continuity of the metal of which the pipe is made and generate decreasing force as the distance from the seal 4 increases so that, after a pre-set length, the reinforcement section 5 does not undergo deformations and remains at its nominal dimensions. In other words, the reinforcement section 5 behaves like an elastic tightening band on the seal.

This latter part of the reinforcement section 5, operating as a spring ring in the elasticity area of the metal of the pipe, remains efficient even after numerous make-up and unscrewing operations and even after various load cycles, and contributes to increasing the contact pressure between the joint surfaces of the two members 1 and 2, avoiding the use of high interference values between the seal surface 4 of the female member 2 and the corresponding surface of the male member 1. Excessive interference values could, in fact, cause galling of the joint during make up and other problems, not ensuring optimal seal of the joint in the various load conditions.

Optimisation of the sizing of joints in accordance with the invention, provided with a sealing, is defined by appropriate mathematical relations between the different parameters of the joint. With said dimensions all parts of the joint work below the contact pressure limit of the material of the pipes and the probabilities of galling are reduced.

In this way, the wall thickness T of the reinforcement section 5 has a value between 10% and 30% of the value wt which represents the wall nominal thickness at the level of the body of the pipe, therefore $$0.1wt = T = 0.3wt$$

while the length of the reinforcement section 5 is within the following interval:

$$5(\ln(wt)/OD0.125) = L = 20(\ln(wt)/OD0.125)$$

where OD represents the nominal external diameter of the pipe.

All the parameters in the preceding formulas are expressed in millimetres.

The table below shows the maximum and minimum values of the length L and thickness T of the reinforcement section 5 for the most common commercial nominal dimensions of the pipe.

| OD (inches) | OD (mm) | wt (mm) | $L_{min}$ (mm) | $L_{max}$ (mm) | $T_{min}$ (mm) | $T_{max}$ (mm) |
|---|---|---|---|---|---|---|
| 7 | 177.8 | 10.36 | 6.12 | 24.47 | 1.04 | 3.11 |
| 9⅝ | 244.5 | 13.84 | 6.61 | 26.43 | 1.38 | 4.15 |
| 13⅜ | 339.7 | 13.06 | 6.20 | 24.80 | 1.31 | 3.92 |

Advantageously the length of the reinforcement section 5 of the joint of the invention is between approximately 6 and 26.5 mm, the thickness is between approximately 1 and 4.5 mm and the distance between the starting point of the thread 7 and the seal surface 4 is within the interval between 0.5 and 5 times the value of the thread pitch.

As regards the external profile of the joint, it can be either conical or cylindrical. A further advantage is represented by the fact that the joint of the invention has a female member or box with an end of considerably reduced thickness, equal to approximately 25% of the total available thickness of the pipe. This permits the creation, on a plane substantially orthogonal to the longitudinal axis of the pipe, of shoulder faces 6', 6" between the members 1 and 2 with larger dimensions, equal to approximately 25% of the total thickness of the pipe. Said shoulder faces, or simply shoulders, can alternatively be arranged in an intermediate position to the threads of the members 1 and 2 or at one end of said threads.

Comparing the solution in accordance with the invention, applied to a joint with shoulders intermediate to the thread, with known joints of the type provided with shoulders always in the same area, in the latter it can be seen that the end of the female member generally represents approximately 40% of the total available thickness of the pipe, limited by pre-determined external diameter and fitting diameter, while the shoulders between the two members represent only approximately 10%. Said shoulders, which represent the main surface withstanding the axial compression loads, are, therefore, less suitable than those of the solution according to the invention to withstand the high compression loads occurring in the use of said pipes, resulting in breakage of the pipe with loads below those that can be withstood by a joint in accordance with the invention. This preferred embodiment of the invention concerns an integral joint of the near-flush type but the same inventive concept can be applied to various other types of joint.

A particularly advantageous application of the invention is obtained in the case of joints provided with long thread, with a small taper and a shoulder for the screwing end stop not near the seal surface but at an appropriate distance from it. With this sizing of the female member 2 it is therefore possible to increase the rigidity of the member 2, guaranteeing an optimal seal, and at the same time improve the axial efficiency of the joint.

Advantageously a toroidal form of the seal surface 4 facilitates maintenance of the contact between the two members 1, 2.

In the above-mentioned description the female member or box 2 has been considered as the thinnest member. The above applies also if the male member or pin 1 is the thinnest member.

The invention claimed is:

1. Threaded joint, defining a longitudinal axis, comprising a first and a second pipe segment,
   the first pipe segment defining a male member (1) of the joint,
   the second pipe segment defining a female member (2) of the joint,
   wherein the first pipe segment (1) is provided with at least one male thread at one end, and the second pipe segment (2) is provided with at least one female thread (7) adapted to be screwed to the male thread to constitute the joint,
   wherein there are provided a first seal surface on the first segment (1) and a second seal surface (4) on the second segment (2) arranged between one end of the female thread and the nearest end of the second pipe segment,
   the first and the second (4) seal surfaces having dimensions such as to generate a reciprocal interference by deformation of the material of the first and second segments of pipe, at least in the end of make up position, thus constituting a metal-metal type joint seal,
   wherein there is provided a reinforcement section (5), positioned at the end of the second pipe segment which protrudes beyond the female thread (7) and having at all points an internal diameter larger than the external nominal diameter of the first pipe segment, the joint being characterised in that said reinforcement section (5) has a minimum axial length $L_{minimum}$ given by the following formula $$L_{minimum} = 5(\ln(wt)/OD^{0.125}),$$

in which OD is the nominal external diameter of first and second pipe segments and wt is the nominal thickness of the wall of first and second segments of pipe, such as not to generate any contact between the first and second pipe segments throughout the length of the reinforcement section (5).

2. Joint as claimed in claim 1, wherein the reinforcement section (5) has a wall thickness T given by the following formula $$0.1wt \leq T \leq 0.3wt.$$

3. Joint as claimed in claim 2, wherein the reinforcement section (5) has an axial length L given by the following formula $$L < 20(\ln(wt)//OD^{0125}).$$

4. Joint as claimed in claim 3, wherein said axial length L is between approximately 6 and 26.5 mm.

5. Joint as claimed in claim 4, wherein the distance between the starting point of the female thread (7) and the seal surface (4) is between 0.5 and 5 times the value of the thread pitch.

6. Joint as claimed in claim 5, wherein there are provided on the first pipe segment (1) at least one first shoulder face (6') and on the second pipe segment (2) at least one second shoulder face (6") having a shape complementary to the first shoulder face, the first and second shoulder faces defining an end of the making up position of the threaded joint, wherein said first and second shoulder faces (6', 6") are arranged in an intermediate position to the male and female threads.

7. Joint as claimed in claim 5, wherein there are provided on the first pipe segment (1) at least one first shoulder face (6') and on the second pipe segment (2) at least one second shoulder face (6") having a shape complementary to the first shoulder face, the first and second shoulder faces defining an end of screwing position of the threaded joint, in which said first and second shoulder faces (6', 6") are arranged at corresponding ends of the male and female threads.

8. Joint as claimed in claim 6, wherein the joint threads have a tapered shape in a section plane passing through the axis of the joint.

9. Joint as claimed in claim 7, wherein the joint threads have a tapered shape in a section plane passing through the axis of the joint.

10. Joint as claimed in claim 6, wherein the joint threads have a cylindrical shape in a section plane passing through the axis of the joint.

11. Joint as claimed in claim 7, wherein the joint threads have a cylindrical shape in a section plane passing through the axis of the joint.

* * * * *